United States Patent
Kageyama et al.

(10) Patent No.: US 12,305,688 B2
(45) Date of Patent: May 20, 2025

(54) BOLT FOR CENTERING COMPONENTS RELATIVE TO EACH OTHER

(71) Applicants: IWATA BOLT KABUSHIKI KAISHA, Tokyo (JP); HONDA MOTOR CO., LTD., Tokyo (JP)

(72) Inventors: Masanao Kageyama, Tokyo (JP); Fumiya Fujihara, Tokyo (JP); Tatsunori Okubo, Tokyo (JP)

(73) Assignees: IWATA BOLT KABUSHIKI KAISHA, Tokyo (JP); HONDA MOTOR CO., LTD., Tokyo (JP)

( * ) Notice: Subject to any disclaimer, the term of this patent is extended or adjusted under 35 U.S.C. 154(b) by 202 days.

(21) Appl. No.: 18/084,736

(22) Filed: Dec. 20, 2022

(65) Prior Publication Data

US 2023/0204064 A1 Jun. 29, 2023

(30) Foreign Application Priority Data

Dec. 23, 2021 (JP) ................................. 2021-209624

(51) Int. Cl.
  *F16B 35/04* (2006.01)
(52) U.S. Cl.
  CPC .................. *F16B 35/048* (2013.01)
(58) Field of Classification Search
  CPC ...... F16B 35/065; F16B 35/048; F16B 5/025; F16B 5/0225
  USPC ....................................................... 411/399
  See application file for complete search history.

(56) References Cited

U.S. PATENT DOCUMENTS

| | | | | |
|---|---|---|---|---|
| 4,516,893 A | * | 5/1985 | Barth | F16B 25/0021 411/184 |
| 4,705,441 A | * | 11/1987 | Arnold | F16B 35/048 411/413 |
| 5,772,376 A | * | 6/1998 | Konig | F16B 35/065 411/188 |
| 6,227,782 B1 | * | 5/2001 | Bowling | F16B 35/048 411/114 |
| 8,231,320 B2 | * | 7/2012 | Hettich | F16B 35/065 411/399 |
| 9,624,961 B2 | * | 4/2017 | Lin | F16B 25/0063 |
| 2019/0242425 A1 | * | 8/2019 | Chen | F16B 35/065 |
| 2021/0062854 A1 | * | 3/2021 | Ramsauer | F16B 35/065 |

FOREIGN PATENT DOCUMENTS

JP 2014-500444 A 1/2014

* cited by examiner

*Primary Examiner* — Flemming Saether
(74) *Attorney, Agent, or Firm* — Oliff PLC

(57) ABSTRACT

A bolt for joining a first component and a second component, the bolt being capable of correcting a position of the second component with respect to the first component is provided. A bolt is fitted in a first hole of a first component and in a second hole of a second component in order to join the first component and the second component. The bolt includes a flange part, a threaded part, a head part, and a centering part. The centering part has a centering part body, and a plurality of blades. Each blade has an external-diameter increase portion in which a distance from the axis to an outer edge gradually increases toward a direction opposite to a tightening rotation direction of the bolt, and a distance from the axis to the outer edge gradually increases along an axial direction toward the flange part.

7 Claims, 12 Drawing Sheets

BOLT FOR CENTERING COMPONENTS RELATIVE TO EACH OTHER

FIELD OF THE INVENTION

The present disclosure relates to a bolt.

BACKGROUND ART

A bolt for joining a first component and a second component has been conventionally known. In particular, a bolt by which a position of a second component with respect to a first component is corrected, in the course of joining the first component and the second component by means of the bolt, is known. For example, Patent Document 1 describes that a first component and a second component are joined by inserting a bolt with a centering cone, which is a truncated conical part, into a hole of the second component while compensating for misalignment between an axis of a hole of the first component and an axis of the hole of the second component.

Patent Document 1: JP 2014-500444 A

SUMMARY OF THE INVENTION

In Patent Document 1, when the bolt is inserted into the hole of the first component and the hole of the second component, a surface delimiting the hole of the second component comes into contact with a surface of the centering cone having a truncated conical shape. Then, the second component slides along the surface of the centering cone. This corrects a position of a second component with respect to the first component. However, when the bolt described in Patent Document 1 is used to correct a position of the second component with respect to the first component, it is necessary to apply a strong force to the bolt upon insertion of the bolt into the hole of the first component and the hole of the second component in order to slide the second component along the surface of the centering cone. Thus, there is a need for a bolt that can more easily correct a position of the second component with respect to the first component.

The present disclosure has been made in consideration of such circumstances. The object of the present disclosure is to provide a bolt for joining a first component and a second component, the bolt being capable of correcting a position of the second component with respect to the first component.

A bolt according to the present disclosure is a bolt having an axis, the bolt being to be fitted in a first hole of a first component and in a second hole of a second component in order to join the first component and the second component, the bolt comprising:
a flange part that abuts against the second component;
a threaded part attached to the flange part, the threaded part being to be inserted into the first hole of the first component;
a head part provided on an opposite side of the threaded part of the flange part; and
a centering part provided between the flange part and the threaded part, the centering part being to be inserted into the second hole of the second component;
wherein:
the centering part has a centering part body, and a plurality of blades provided on an outer circumference of the centering part body to extend in a circumferential direction; and
each blade has an external-diameter increase portion in which a distance from the axis to an outer edge gradually increases toward a direction opposite to a tightening rotation direction of the bolt, and a distance from the axis to the outer edge gradually increases along an axial direction toward the flange part.

Preferably in the bolt of the present disclosure,
the external-diameter increase portion has a first inclined surface, and a second inclined surface positioned closer to the threaded part in the axial direction than the first inclined surface;
in a section passing through the axis of the bolt, the first inclined surface has a first angle θ1 inclined with respect to the axis, and the second inclined surface has a second angle θ2 inclined with respect to the axis; and
the second angle θ2 is larger than the first angle θ1.

Preferably in the bolt of the present disclosure,
the first inclined surface and the second inclined surface are connected to each other at an inclined surface ridge; and
the inclined surface ridge is inclined to be away from the flange part toward the tightening rotation direction.

Preferably in the bolt of the present disclosure,
the centering part has the blades the number of which is between three or more and six or less.

Preferably in the bolt of the present disclosure,
a width of the blade in the axial direction is 0.7 mm or less. Preferably in the bolt of the present disclosure,
a width of the blade in the axial direction is between 0.8 times or more and 1 times or less a thickness of the second component.

Preferably in the bolt of the present disclosure,
a maximum distance from the axis to an outer edge of the blade is between 0.95 times or more and 1 times or less a radius of the second hole.

The present disclosure can provide a bolt for joining a first component and a second component, the bolt being capable of correcting a position of the second component with respect to the first component.

DETAILED DESCRIPTION OF THE INVENTION

Figure 1:
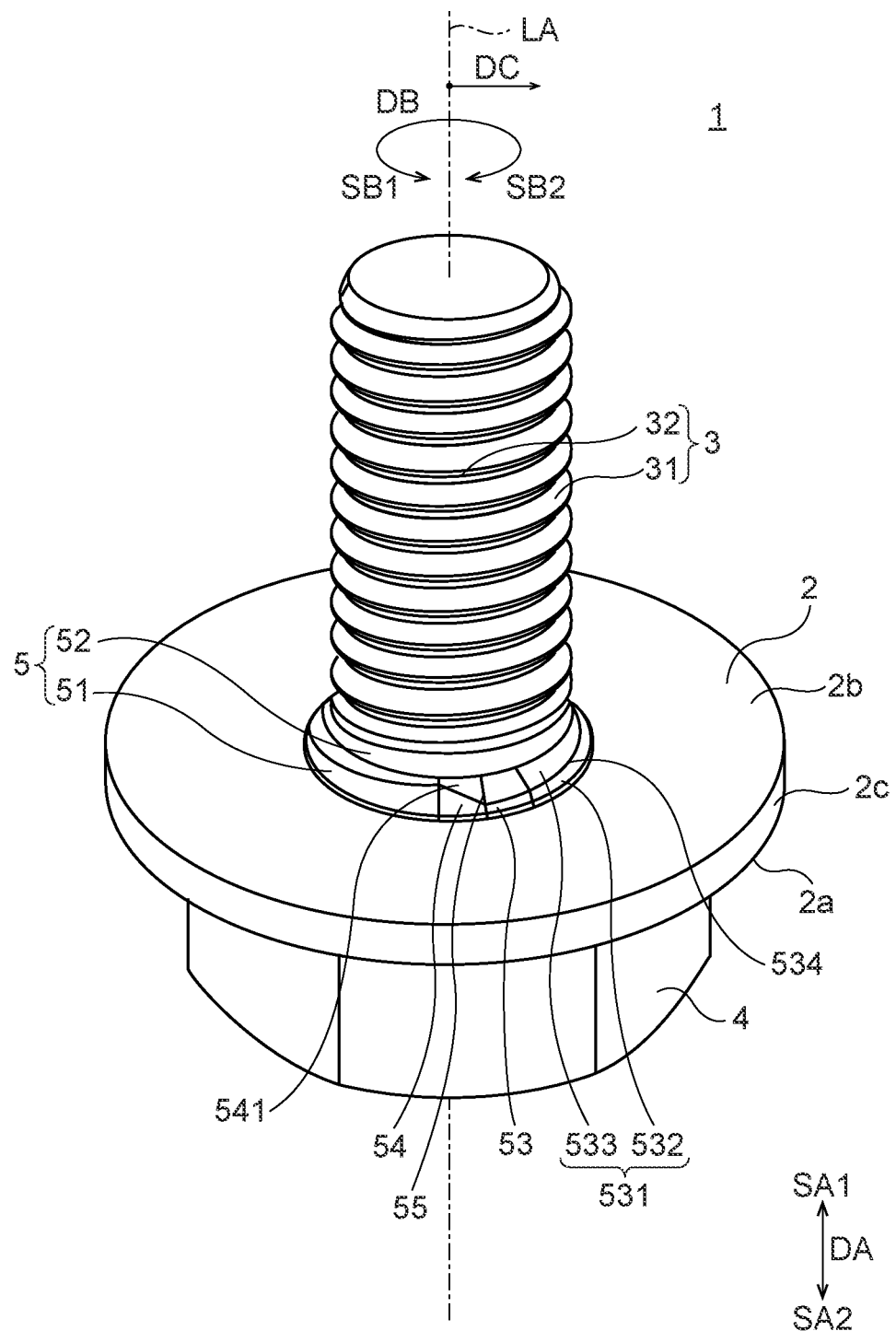
FIG. 1 is a perspective view showing an example of a bolt according to an embodiment of the present disclosure.

A bolt in an embodiment of the present disclosure is described first, with reference to FIGS. 1 to 11. The bolt in the embodiment of the present disclosure is a bolt 1 for joining a first component 7 having a first hole 71 and a second component 8 having a second hole 81, the bolt 1 being capable of correcting a position of the second component 8 with resect to the first component 7. The bolt 1 has an object of centering. Namely, as described below, the bolt 1 has a function of correcting a position of the second component 8 with respect to the first component 7.

Figure 2:
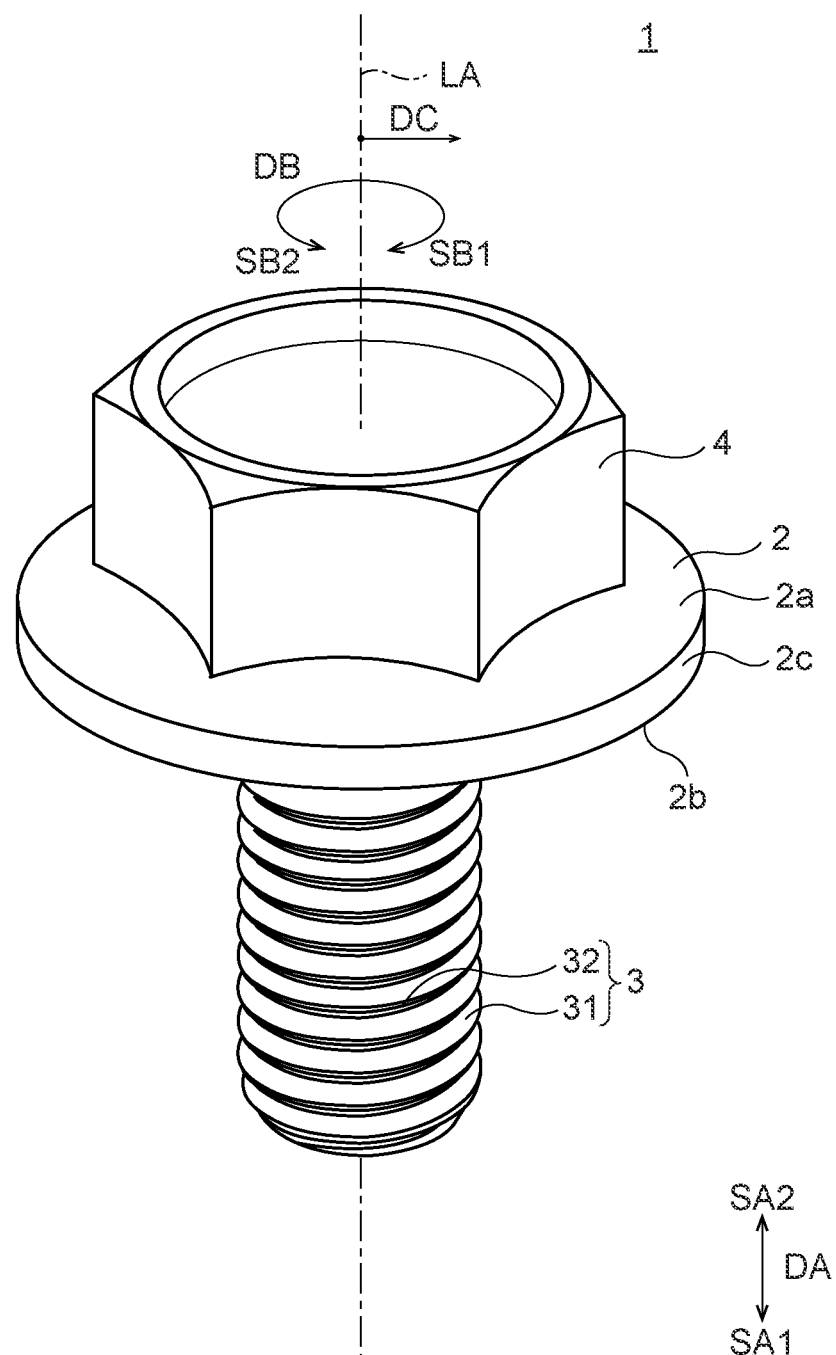
FIG. 2 is a perspective view showing the example of the bolt according to the embodiment of the present disclosure.

FIG. 1 is a perspective view showing the bolt 1. FIG. 2 is a perspective view of the bolt 1 seen from a direction different from that of FIG. 1. As shown in FIGS. 1 and 2, the bolt 1 having an axis LA comprises: a flange part 2 that abuts against the second component; a threaded part 3 attached to the flange part 2, the threaded part 3 being to be inserted into the first hole 71 of the first component 7; a head part 4 provided on an opposite side of the threaded part 3 of the flange part 2; and a centering part 5 provided between the flange part 2 and the threaded part 3, the centering part 5 being to be inserted into the second hole 81 of the second component 8. In the example shown in FIGS. 1 and 2, the flange part 2, the threaded part 3, the head part 4 and the centering part 5, which constitute the bolt 1, are integrally formed. As shown in FIGS. 1 and 2, the threaded part 3 has an external thread 31. A material of the bolt 1 is, for example, a metal material similar to a common bolt material.

When joining the first component 7 and the second component 8, the bolt 1 is rotated about the axis LA. A direction of the axis LA is referred to as an axial direction DA, and a direction around the axis LA is referred to as a circumferential direction DB. In the axial direction DA, a direction in which the bolt 1 moves when it is tightened is referred to as an entry direction SA1, and a direction in which the bolt 1 moves when it is loosened is referred to as an exit direction SA2. In addition, a radial direction of the bolt is a radial direction DC.

In the circumferential direction DB, a direction in which the bolt 1 is rotated when the bolt 1 is tightened is referred to as a tightening rotation direction SB1. In the circumferential direction DB, a direction in which the bolt is rotated when the bolt 1 is loosened is referred to as a loosening rotation direction SB2.

Figure 3:
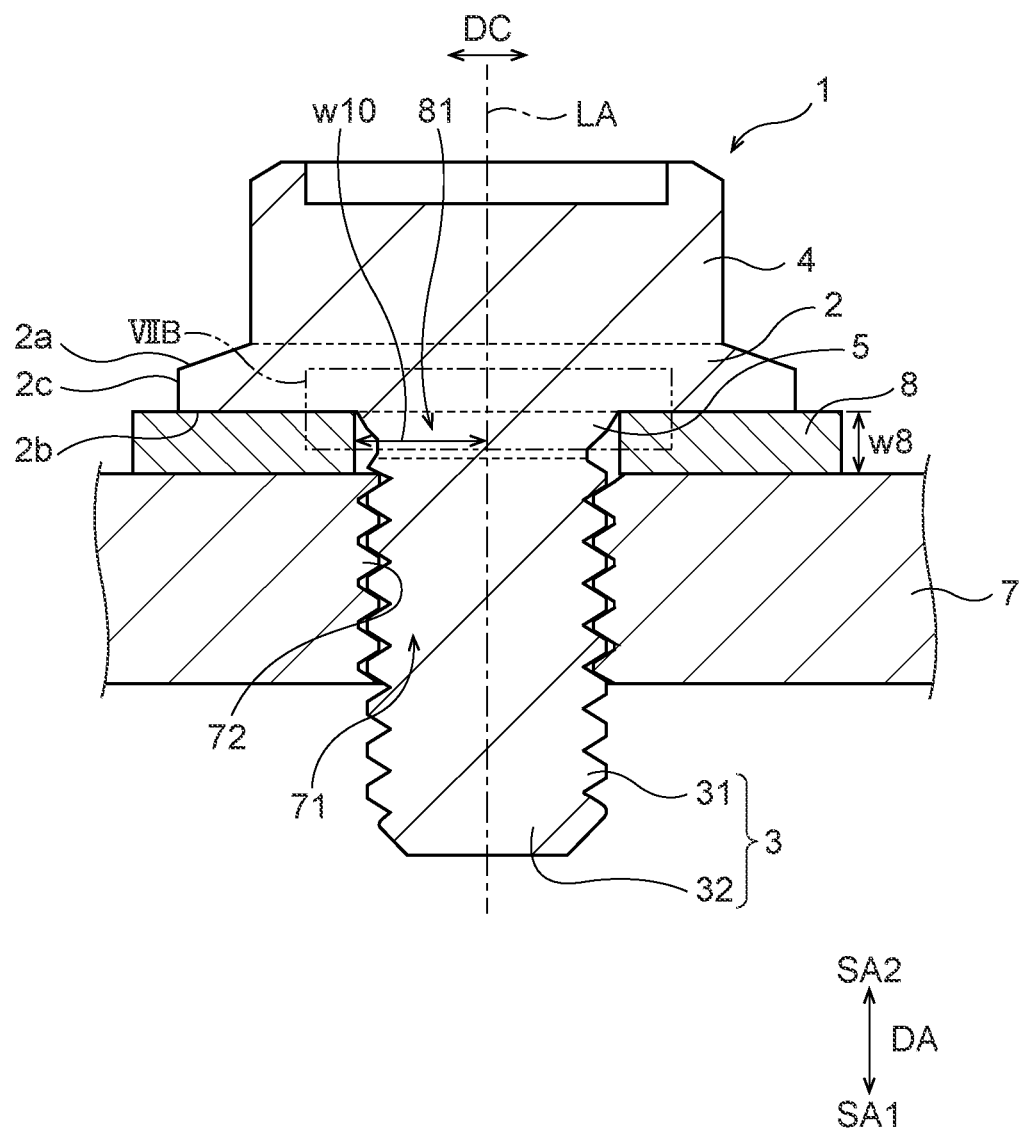
FIG. 3 is a sectional view showing an example in which the bolt according to the embodiment of the present disclosure joins a first component and a second component.

FIG. 3 is a sectional view showing an example in which the bolt 1 joins the first component 7 and the second component 8. Broken lines shown in FIG. 3 are lines indicating boundaries of the flange part 2, the threaded part 3, the head part 4 and the centering part 5 for the sake of convenience. In the example shown in FIG. 3, as described above, the first component 7 has the first hole 71, and the second component 8 has the second hole 81. In the example shown in FIG. 3, the first component 7 and the second component 8 have a plate-like shape. As shown in FIG. 3, the bolt 1 is fitted in the first hole 71 and the second hole 81 in order to join the first component 7 and the second component 8. Materials of the first component 7 and the second component 8 are not particularly limited, as long as they can be joined by means of the bolt 1. The first component 7 and the second component 8 include at least any one of a metal and a resin, for example.

An inner wall of the first hole 71 is provided at least partly with an internal thread 72. In the example shown in FIG. 3, the first component 7 is an integrally formed plate-shaped component. In the example shown in FIG. 3, the internal thread 72 is provided over the entire inner wall of the first hole 71. The second hole 81 has a size allowing the threaded part 3 to pass therethrough. The second hole 81 has a diameter larger than a maximum width of the threaded part 3 in the radial direction DC. As described below, the threaded part 3 has a threaded part body 32, and the external thread 31 provided on the threaded part body 32. In this embodiment, when the threaded part 3 is inserted into the first hole 71 from a distal end of the threaded part 3 in the entry direction SA1, and the bolt 1 is rotated in the tightening rotation direction SB1, the external thread 31 is engaged with the internal thread 72 so that the bolt 1 can be tightened to the first component 7. The threaded part 3 is passed through the second hole 81, the external thread 31 is engaged with the internal thread 72, and the bolt 1 is tightened to the first component 7. This can join the first component 7 and the second component 8 by means of the bolt 1. On the other hand, as shown in FIG. 3, in a state where the first component 7 and the second component 8 are joined by means of the bolt 1, the bolt 1 is rotated in the loosening rotation direction SB2. This can loosen the engagement of the external thread 31 with the internal thread 72 so that the bolt 1 can be loosened with respect to the first component 7. Namely, by loosening the bolt 1 with respect to the first component 7, the first component 7 and the second component 8 joined by means of the bolt 1 are disengaged so that the first component 7 and the second component 8 can be separated from each other.

As shown in FIG. 3, when the first component 7 is an integrally formed plate-shaped component and has the internal thread 72 provided in the inner wall of the first hole 72, the first component 7 is made of a metal, for example. When the first component 7 is made of a metal, the internal thread 72 has improved durability against a force which is applied to the internal thread 72 when the external thread 31 is engaged with the internal thread 72, for example.

Figure 4:
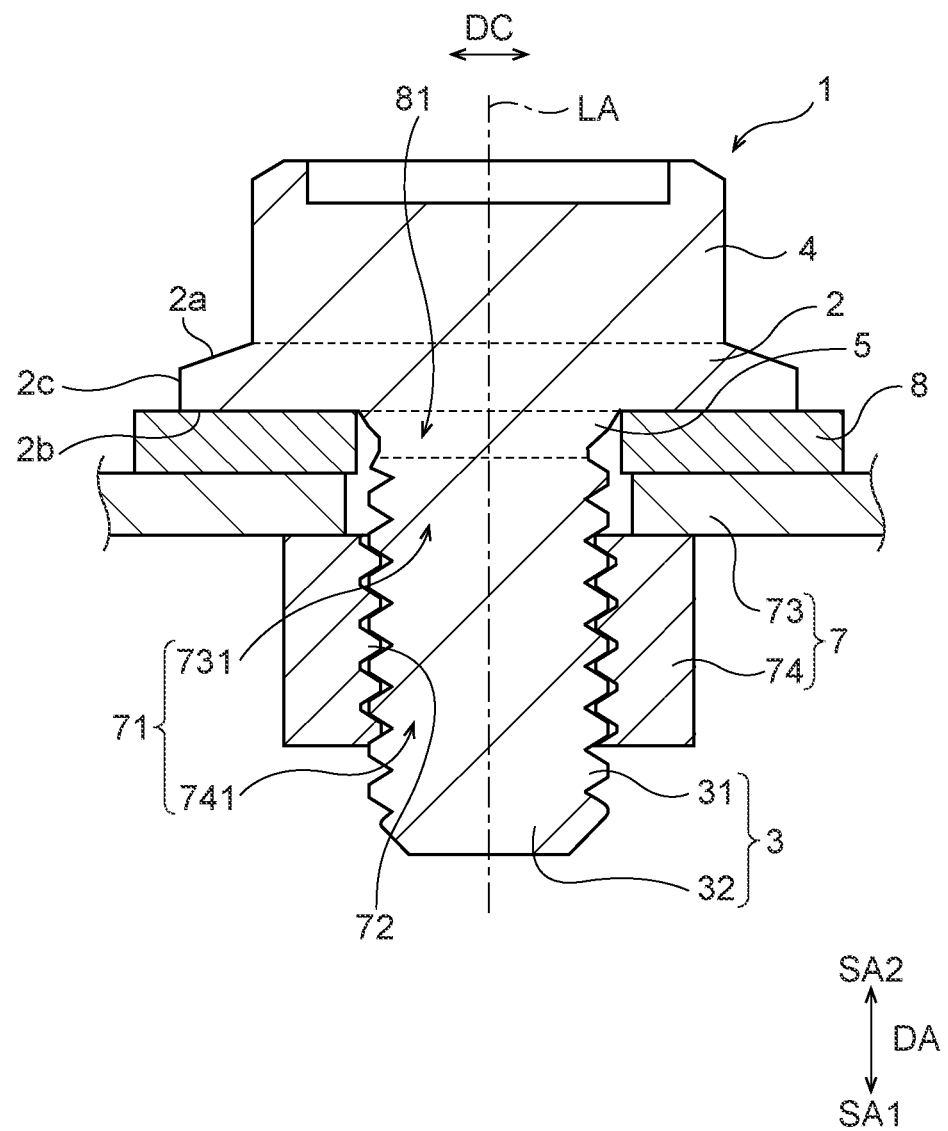
FIG. 4 is a sectional view showing another example in which the bolt according to the embodiment of the present disclosure joins the first component and the second component.
Figure 5:
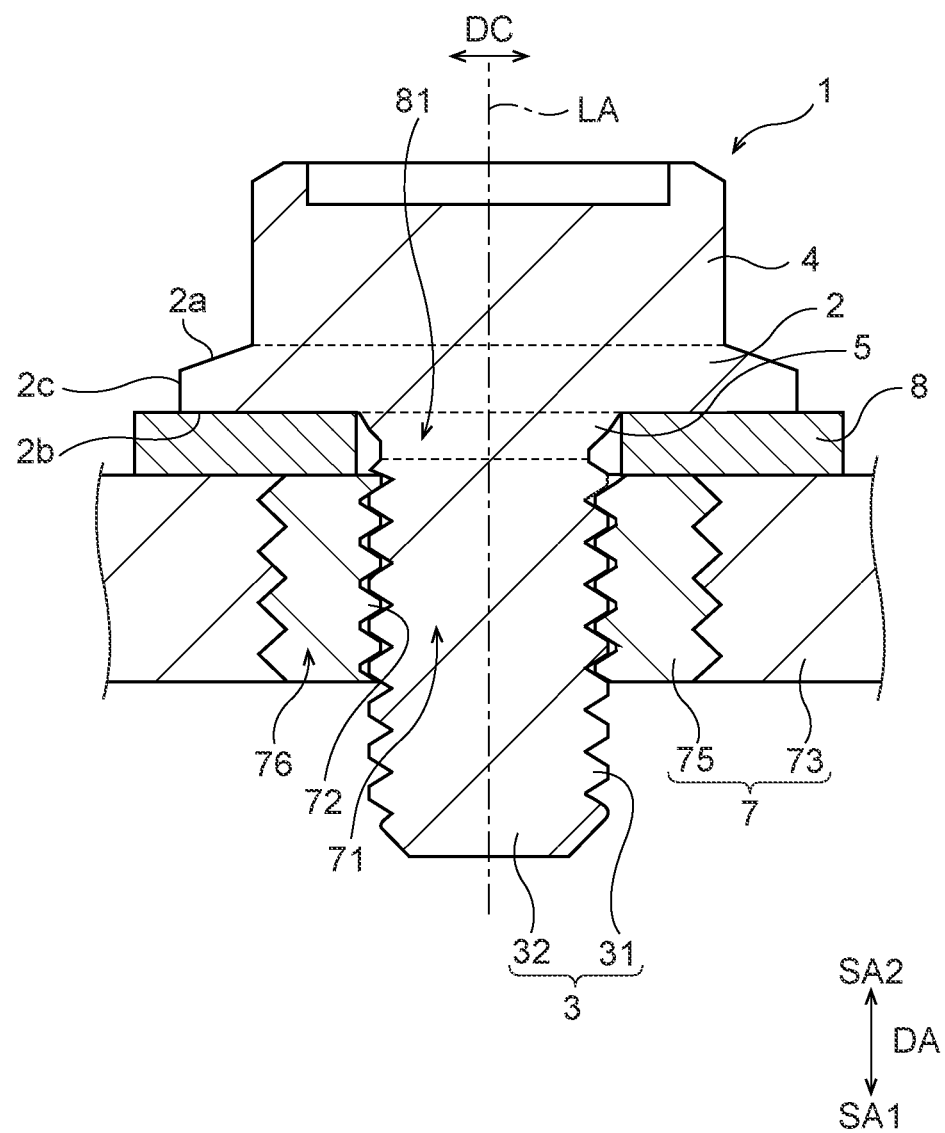
FIG. 5 is a sectional view showing another example in which the bolt according to the embodiment of the present disclosure joins the first component and the second component.

The embodiment of the first component 7 is not limited to the embodiment shown in FIG. 3. The embodiment of the first component 7 includes an embodiment in which the first component 7 is made of a resin having a lower mechanical strength, the first hole 71 has no internal thread 72 before the threaded part 3 is inserted into the first hole 71, and the internal thread 72 is formed in the first hole 71 by inserting the threaded part 3 into the first hole 71 and by tightening the bolt 1. FIG. 4 is a sectional view showing an example different from that of FIG. 3, in which the bolt 1 joins the first component 7 and the second component 8. In addition, FIG. 5 is a sectional view showing an example different from those of FIGS. 3 and 4, in which the bolt 1 joins the first component 7 and the second component 8. Broken lines shown in FIGS. 4 and 5 are lines indicating boundaries of the flange part 2, the threaded part 3, the head part 4 and the centering part 5 for the sake of convenience.

In the example shown in FIG. 4, the first component 7 has a component body 73 and a nut 74. The component body 73 has a plate-like shape. In addition, the component body 73 has a body hole 731. The body hole 731 has a size allowing the threaded part 3 of the bolt 1 to pass therethrough. In FIG.

4, an inner wall of the body hole 731 is not provided with the internal thread 72. The nut 74 is a nut of a common shape, for example. The nut 74 has a nut hole 741. An inner wall of the nut hole 741 is provided with the internal thread 72. As shown in FIG. 4, the nut 74 is fixed to the component body 73 by welding or the like, in such a manner that the nut hole 741 overlaps with the body hole 731. Thus, the body hole 731 and the nut hole 741 constitute a first hole 71. As described above, since the inner wall of the nut hole 741 is provided with the internal thread 72 while the inner wall of the body hole 731 is not provided with the internal thread 72, an inner wall of the first hole 71 is partly provided with the internal thread 72. In the first component 7 shown in FIG. 4, a material of the component body 73 is a metal, for example. A material of the nut 74 is a metal, for example.

In the example shown in FIG. 5, the first component 7 has a component body 73 and an insertion nut 75. In the example shown in FIG. 5, the component body 73 has an embedded hole 76. The insertion nut 75 is embedded in the embedded hole 76. A contact surface between the insertion nut 75 and an inner wall of the embedded hole 76 has an irregular shape. Since the contact surface between the insertion nut 75 and the inner wall of the embedded hole 76 has an irregular shape, detachment of the insertion nut 75 from the embedded hole 76 can be restrained. In the example shown in FIG. 5, the first hole 71 is provided in the insertion nut 75 of the first component 7. The internal thread 72 is provided over the entire inner wall of the first hole 71 provided in the insertion nut 75.

In FIG. 5, a method of forming the first component 7, which has the component body 73 and the insertion nut 75 embedded in the embedded hole 76 of the component body 73, is not particularly limited. The first component 7 shown in FIG. 5, which has the component body 73 and the insertion nut 75, can be formed by an expansion method, a press-fit method, a thermal press-fit method, or a simultaneous molding method, for example. A material of the component body 73 of the first component 7 shown in FIG. 5 is a resin, for example. A material of the insertion nut 75 is a metal, for example.

As shown in FIG. 5, according to the first component 7 having the component body 73 and the insertion nut 75, a material of the insertion nut 75 in which the first hole 71 is provided can be a metal. Thus, the durability of the internal thread 72 can be improved by a metal which constitutes the inner wall of the first hole 71 in which the internal thread 72 is provided, while a material of the component body 73 is a material other than a metal, such as a resin.

Also in the examples shown in FIGS. 4 and 5, the first component 7 and the second component 8 can be joined by means of the bolt 1, by passing the threaded part 3 through the second hole 81 and by engaging the external thread 31 of the threaded part 3 with the internal thread 72 provided in the first hole 71.

By way of example, a planar shape of the first component 7 is larger than a planar shape of the second component 8. In the examples shown in FIGS. 3 to 5, the first component 7 and the second component 8 have a plate-like shape. In addition, a thickness of the first component 7 is larger than a thickness of the second component 8. Further, a planar dimension of a maximum surface of the first component 7 is larger than a planar dimension of a maximum surface of the second component 8. By way of example, the first component 7 is a component that forms an outer shape of a product manufactured by using the bolt 1, such as a body of a motor vehicle, and a frame thereof, as well as a housing of a machine or an electronic device. In this case, the second component 8 is a component attached to the exemplified first component 7.

Next, the respective constituent elements of the bolt 1 are further described.

The flange part 2 of the bolt 1 is described first. As shown in FIGS. 3 to 5, the flange part 2 abuts against the second component 8. In the examples shown in FIGS. 1 to 5, the flange part 2 has a first surface 2a positioned on a side of the exit direction SA2 of the bolt 1, a second surface 2b positioned on a side of the entry direction SA1 of the bolt 1, and a third surface 2c forming an outer surface in the radial direction DC. As shown in FIGS. 3 to 5, the flange part 2 abuts against the second component 8 at the second surface 2b.

Figure 6:
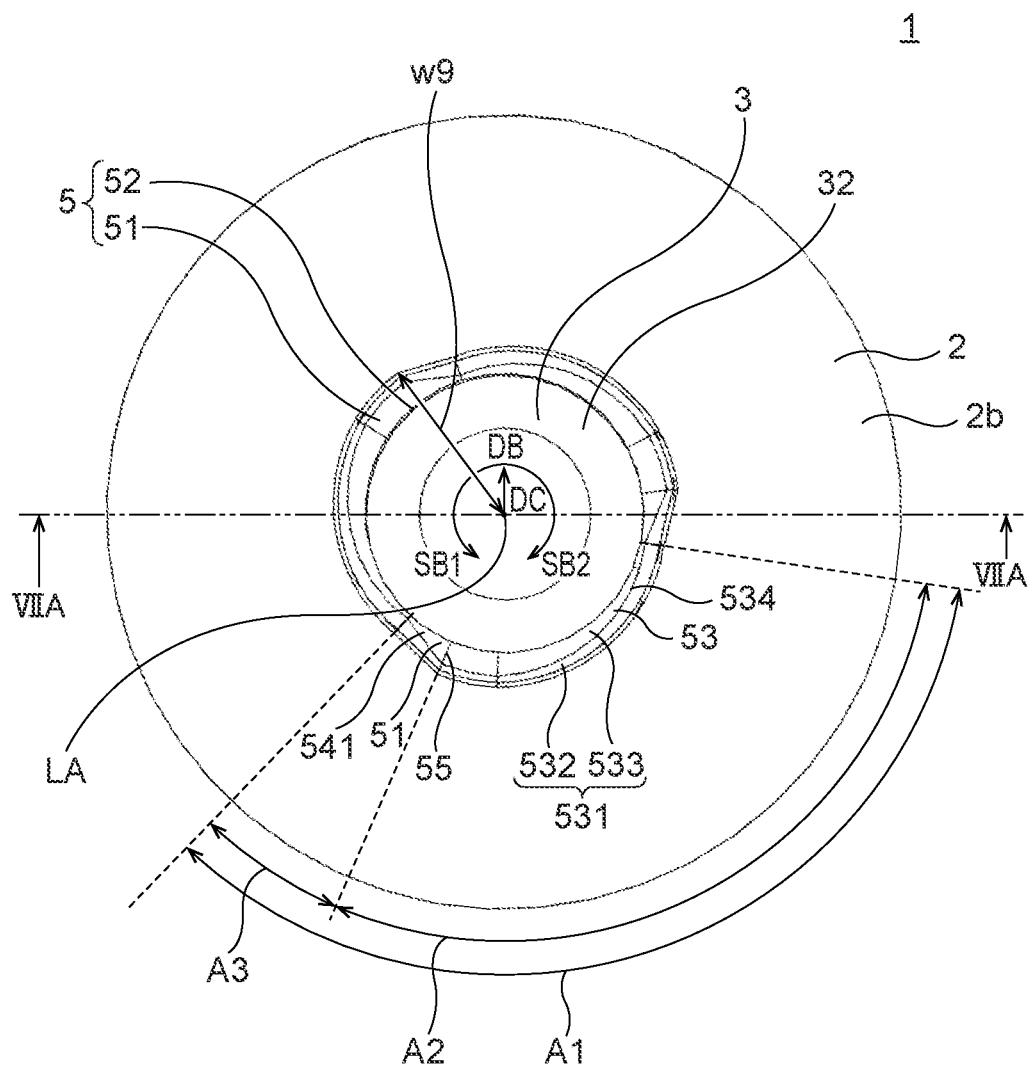
FIG. 6 is a plan view showing an example of the bolt according to the embodiment of the present disclosure.

FIG. 6 is a plan view of the bolt 1 seen from the axial direction DA. In particular, FIG. 6 shows the bolt 1 seen from the threaded part 3 side. In FIG. 6, illustration of the external thread 31 of the threaded part 3 of the bolt 1 is omitted, and an outer shape of the threaded part body 32 of the threaded part 3 is illustrated. As shown in FIG. 6, the flange part 2 has a circular profile centering on the axis LA, when seen from the threaded part 3 side.

Next, the threaded part 3 of the bolt 1 is described. The threaded part 3 is attached to the flange part 2, and is inserted into the first hole 71 of the first component 7. As shown in FIGS. 3 to 5, in a state where the first component 7 and the second component 8 are joined by means of the bolt 1, the threaded part 3 is at least partly positioned in the first hole 71 of the first component 7. As shown in FIGS. 3 to 5, the threaded part 3 is positioned on a side of the entry direction SA1 of the flange part 2, and is attached to the flange part 2 through the centering part 5. In the examples shown in FIGS. 3 to 5, the threaded part 3 is partly positioned in the first hole 71 and partly positioned in the second hole 81. Although not shown, in a state where the bolt 1 joins the first component 7 and the second component 8, the threaded part 3 may not have a part that is positioned in the second hole 81.

As described above, the threaded part 3 has the threaded part body 32, and the external thread 31 provided on the threaded part body 32. The threaded part body 32 has a substantially columnar shape extending in the axial direction DA. The threaded part body 32 has a rotationally symmetric shape centering on the axis LA. The external thread 32 is provided on a side surface of the threaded part body 32. The external thread 31 is provided to helically run around the threaded part body 32.

Next, the head part 4 is described. The head part 4 is provided on an opposite side of the threaded part 3 of the flange part 2. In other words, the head part 4 is provided on a side of the exit direction SA2 of the flange part 2. By way of example, when the bolt 1 is tightened to the first component 7 by rotating the bolt 1 to engage the external thread 31 with the internal thread 72, the head part 4 is held by a tool in order to apply a rotational force to the bolt 1. By way of example, the head part 4 is held by a common tool for rotating a bolt, such as a common wrench. In the example shown in FIG. 2, the head part 4 has substantially a hexagonal shape extending in the axial direction DA. Thus, the head part 4 is held in a hexagonal socket of a common socket wrench. Thus, the bolt 1 can be rotated by operating a socket wrench having a hexagonal socket which holds the head part 4.

In the examples shown in FIGS. 1 to 5, a surface of the head part 4 is connected to the first surface 2a of the flange part 2. Although not shown, an outer shape of the head part 4 and an outer shape of the flange part 2 may conform to each other when the bolt 1 is seen from the head part 4 side, so that an outer surface of the head 4 is connected to the third surface 2c of the flange part 2. In this case, the flange part 2 does not have the first surface 2a. For example, the head part 4 and the flange part 2 may together define a substantially columnar shape or a substantially prismatic shape as a whole.

Next, the centering part 5 is described. The centering part 5 is provided between the flange part 2 and the screw part 3, and is inserted into the second hole 81 of the second component 8. As shown in FIGS. 3 to 5, in a state where the first component 7 and the second component 8 are joined by means of the bolt 1, the centering part 5 is at least partly positioned in the second hole 81 of the second component 8. As described above, the centering part 5 is provided between the flange part 2 and the threaded part 3 to attach the flange part 2 and the threaded part 3 to each other. In the examples shown in FIGS. 1 to 5, the centering part 5 is connected to the second surface 2b of the flange part 2.

Figure 7:
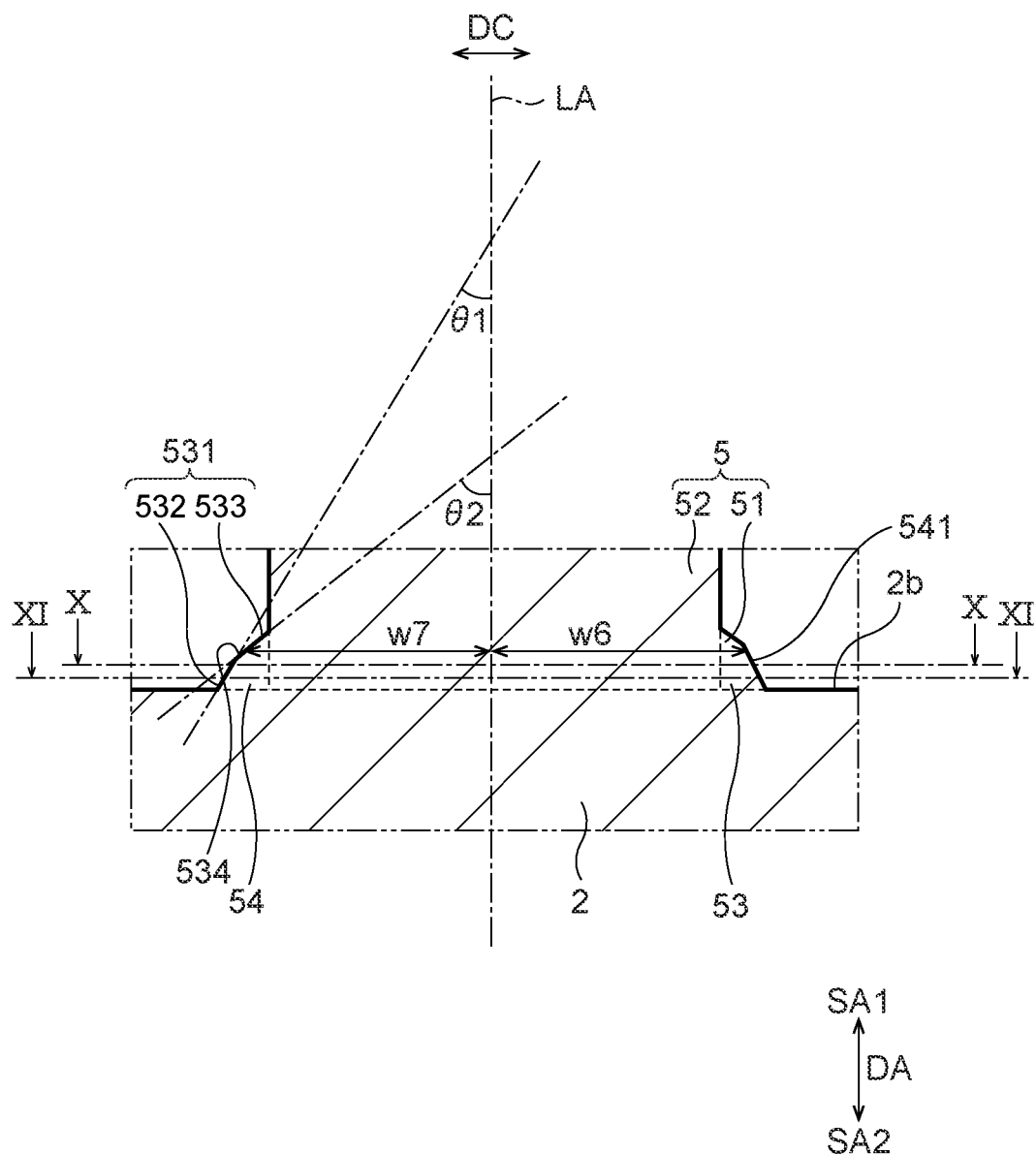
FIG. 7 is a partial sectional view of the bolt according to the embodiment of the present disclosure along a line VIIA-VIIA of FIG. 6.

The centering part 5 has a centering part body 52, and a plurality of blades 51 the number of which is, for example, between three or more and six or less. The blades 52 are provided on an outer circumference of the centering part body 52 to be evenly or substantially evenly arranged at predetermined intervals therebetween along the circumferential direction DB. The blades 51 are preferably arranged evenly, but may be arranged substantially evenly within a tolerance of +5°. FIG. 7 is a partial sectional view showing an area around the centering part 5, in a section of the bolt 1 which is cut along a line VIIA-VIIA of FIG. 6. In particular, FIG. 7 corresponds to a sectional view showing a section passing through the axis LA of the bolt 1. In addition, FIG. 7 corresponds to a view showing in enlargement of a section of the bolt 1 in an area surrounded by one-dot chain lines indicated by a reference numeral VIIB of FIG. 3. Broken lines shown in FIG. 7 are lines indicating a boundary between the centering part body 52 and the blade 51, and a boundary between the flange part 2 and the centering part 5 for the sake of convenience.

The centering part body 52 shown in FIGS. 1 and 7 has a rotationally symmetric shape centering on the axis LA. By way of example, the centering part body 52 and the threaded part body 32 together define a substantially columnar shape as a whole.

The blades 51 are provided side by side along the circumferential direction DB, on a side surface of the centering part body 52 having a columnar shape.

Each blade 51 provided on the outer circumference of the centering part body 52 has an external-diameter increase portion 53 in which a distance w6 from the axis LA to an outer edge gradually increases toward a direction opposite to the tightening rotation direction SB1 of the bolt 1 (toward the loosening rotation direction SB2), and the distance w6 from the axis LA to the outer edge gradually increases along the axial direction DA toward the flange part 2 (toward the exit direction SA2). As shown in FIG. 7, the distance w6 corresponds to a distance between the outer edge of the external-diameter increase portion 53 and the axis LA in the radial direction DC.

In FIGS. 1, 6 and 7, the blade 51 is formed of a projection projecting in the radial direction DC. The blade 51 formed of a projection has an external-diameter increase surface 531 corresponding to the outer edge of the external-diameter increase portion 53, and a below-described external-diameter decrease surface 541 corresponding to an outer edge of a connection portion 54. The external-diameter increase surface 531 is provided closer to the tightening rotation direction SB1 than the external-diameter decrease surface 541.

As shown in FIG. 6, the external-diameter increase surface 531 is located on a part of an area A1 on which one blade 51 is provided in the circumferential direction DB. The blade 51 has the external-diameter increase portion 53 having the external-diameter increase surface 531, and the connection portion 54 having the external-diameter decrease surface 541. The external-diameter increase portion 53 is positioned in an area A2 that defines a part of the area A1. The connection portion 54 is positioned in an area A3 of the area A1, which is other than the area A2.

As shown in FIGS. 1 and 7, the external-diameter increase surface 531 is inclined in the circumferential direction DB such that the distance w6 from the axis LA to the outer edge of the external-diameter increase portion 53 gradually increases toward the loosening rotation direction SB2. Thus, the distance w6 from the axis LA to the outer edge of the external-diameter increase portion 53 gradually increases toward the loosening rotation direction SB2, in other words, in a direction opposite to the tightening rotation direction SB of the bolt 1. In addition, the external-diameter increase surface 531 is inclined with respect to the axial direction DA such that the distance w6 from the axis LA to the outer edge of the external-diameter increase portion 53 gradually increases toward the exit direction SA2. Thus, the distance w6 from the axis LA to the outer edge of the external-diameter increase portion 53 gradually increases toward the exit direction SA2, in other words, along the axial direction DA toward the flange part 2.

The connection portion 54 is a portion that connects the centering part body 52 and the external-diameter increase portion 53 of the blade 51. A shape of the connection portion 54 is not particularly limited as long as it does not significantly interfere with a below-described operation of the external-diameter increase portion 53. The connection portion 54 preferably does not come into contact with the inner wall of the second hole 81, when the centering portion 5 is inserted into the second hole 81 of the second component 8 and the bolt 1 is rotated in the tightening rotation direction SB1. The external-diameter decrease surface 541 is inclined with respect to the circumferential direction DB such that a distance w7 from the axis LA to the outer edge of the connection portion 54 gradually decreases toward the loosening rotation direction SB2. In addition, the external-diameter decrease surface 541 is inclined with respect to the axial direction DA such that the distance w7 from the axis LA to the outer edge of the connection portion 54 gradually increases toward the exit direction SA2. As shown in FIG. 7, the distance w7 corresponds to a distance between the outer edge of the connection portion 54 and the axis LA in the radial direction DC.

The expression that the distance w6 or the distance w7 "gradually increases" means that the distance w6 or the distance w7 increases without decreasing. The expression that the distance w6 or the distance w7 "gradually increases" does not exclude the fact that there is an area in which the distance w6 or the distance w7 is constant (area in which the distance w6 or the distance 7 is unchanged). Namely, an embodiment in which the distance w6 or the distance w7 "gradually increases" includes an embodiment including an area in which the distance w6 or the distance w7 increases, and an area in which the distance w6 or the distance w7 is constant. Specifically, an embodiment in which the distance w6 or the distance w7 "gradually increases" includes a first increase area and a second increase area in which the distance w6 or the distance w7 increases, and a constant area positioned between the first increase area and the second increase area, in which the distance w6 or the distance w7 is constant. The expression that the distance w6 or the distance w7 "gradually decreases" means that the distance w6 or the distance w7 decreases without increasing. The expression that the distance w6 or the distance w7 "gradually decreases" does not exclude the fact that there is an area in which the distance w6 or the distance w7 is constant (area in which the distance w6 or the distance 7 is unchanged). Namely, an embodiment in which the distance w6 or the distance w7 "gradually decreases" includes an embodiment including an area in which the distance w6 or the distance w7 decreases, and an area in which the distance w6 or the distance w7 is constant. Specifically, an embodiment in which the distance w6 or the distance w7 "gradually decreases" includes a first decrease area and a second decrease area in which the distance w6 or the distance w7 decreases, and a constant area positioned between the first decrease area and the second decrease area, in which the distance w6 or the distance w7 is constant.

In the example shown in FIG. 1, the external-diameter increase surface 531 of the external-diameter increase portion 53 is connected to the second surface 2b of the flange part 2 and a side surface of the centering part body 52. In addition, the external-diameter decrease surface 541 of the connection portion 54 is connected to the second surface 2b of the flange part 2 and the side surface of the centering part body 52. The external-diameter increase surface 531 and the external-diameter decrease surface 541 are connected to each other at a ridge 55 of the blade 51 formed of a projection.

The external-diameter increase portion 53 has a first inclined surface 532 and a second inclined surface 533.

As shown in FIG. 1, the external-diameter increase surface 531 of the external-diameter increase portion 53 has the first inclined surface 532 inclined with respect to the axis LA, and the second inclined surface 533 positioned closer to the threaded part 3 than the first inclined surface 532 in the axial direction DA. The second inclined surface 533 is positioned closer to the entry direction SA1 than the first inclined surface 53, in other words, closer to the threaded part 3 than the first inclined surface 532 in the axial direction DA. An angle at which the first inclined surface 532 is inclined with respect to the axis LA, and an angle at which the second inclined surface 533 is inclined with respect to the axis LA differ from each other. Namely, in a section passing though the axis LA of the bolt 1, the first inclined surface 532 is inclined with respect to the axis LA at a first angle θ1, and the second inclined surface 533 is inclined with respect to the axis LA at a second angle θ2.

As described above, FIG. 7 corresponds to a sectional view showing a section passing through the axis LA of the bolt 1.

As shown in FIG. 7, the second angle θ2 of the second inclined surface 533 is larger than the first angle θ1 of the first inclined surface 532. To be more specific, in the section of the bolt 1, the second angle θ2, which is an angle at which the second inclined surface 533 is inclined with respect to the axis LA, is larger than the first angle θ1, which is an angle at which the first inclined surface 532 is inclined with respect to the axis LA.

By way of example, the first inclined surface 532 is a smooth curved surface. Each of the first inclined surface 532 and the second inclined surface 533 is inclined such that the distance w6 from the axis LA to the outer edge of the external-diameter increase portion 53 gradually increases toward the loosening rotation direction SB2. In addition, each of the first inclined surface 532 and the second inclined surface 533 is inclined such that the distance w6 from the axis LA to the outer edge of the external-diameter increase portion 53 gradually increases toward the exit direction SA2.

Figure 8:
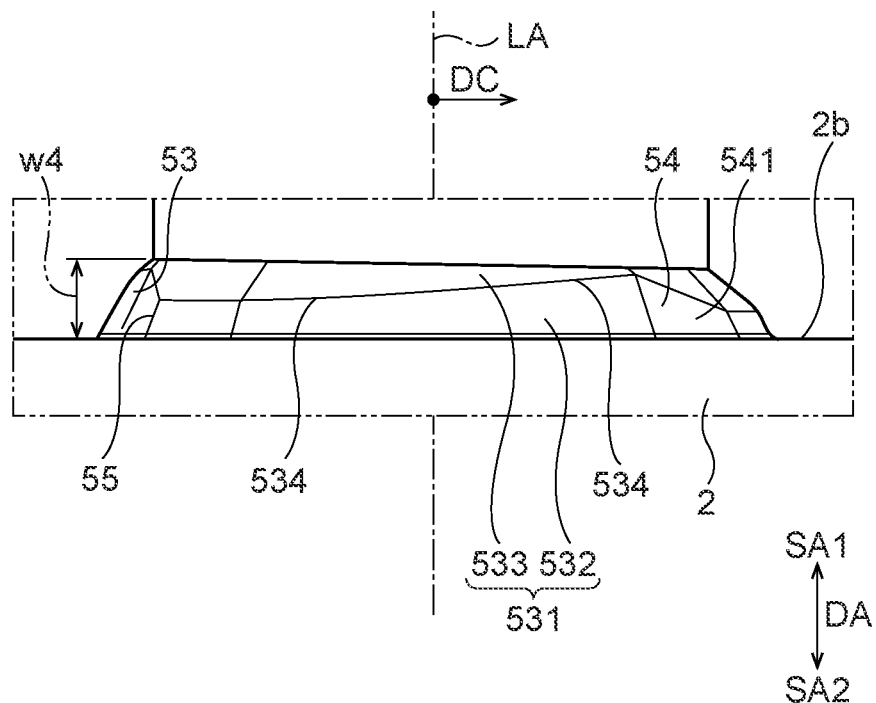
FIG. 8 is a side view showing an example of the bolt according to the embodiment of the present disclosure.

FIG. 8 is a side view showing an area around the centering part 5 of the bolt 1 seen from the radial direction DC. As shown in FIGS. 1 and 8, the first inclined surface 532 and the second inclined surface 533 are connected to each other at an inclined surface ridge 534. As shown in FIGS. 1 and 8, the inclined surface ridge 534 is inclined to be away from the flange part 2 toward the tightening rotation direction SB1. In the example shown in FIG. 8, the inclined surface ridge 534 is inclined with respect to the axial direction DA to be away from the flange part 2 toward the tightening rotation direction SB1. In addition, the inclined surface ridge 534 is inclined with respect to the circumferential direction DB to come close to the axis LA toward the tightening rotation direction SB1.

In the examples shown in FIGS. 1, 7 and 8, the first inclined surface 532 is connected to the second surface 2b of the flange part 2. In addition, in the examples shown in FIGS. 1, 7 and 8, the second inclined surface 533 is connected to the side surface of the centering part body 52.

By way of example, the centering part 5 has the blades 51 the number of which is between three or more and six or less. In the example shown in FIGS. 1 and 6, the centering part 5 has three blades 51. By way of example, the blades 51 have the same shape. In the example shown in FIG. 6, the blades 51 are arranged equidistantly in the circumferential direction DB.

(Operation)

Next, an operation of the bolt 1 as structured above is described. In particular, an operation of the bolt 1 which joins the first component 7 and the second component 8, which have a plate-like shape shown in FIG. 3, is described. First, the first component 7 having the first hole 71 and the second component 8 having the second hole 81 are prepared.

Next, the first component 7 and the second component 8 are placed on top of each other such that the first hole 71 and the second hole 82 are aligned. In the example shown in FIG. 9, the first component 7 and the second component 8, which have a plate-like shape, are arranged non-parallel to a horizontal plane G. In particular, the first component 7 and the second component 8 are arranged perpendicularly to the horizontal plane G. In the example shown in FIG. 9, the second component 8 is supported on the horizontal plane G, while the first component 7 is spaced apart from the horizontal plane G.

Next, the threaded part 3 of the bolt 1 is passed through the second hole 81 from a distal end of the threaded part 3 in the entry direction SA1, and then the external thread 31 of the threaded part 3 is partly engaged with the internal thread 72 provided in the first hole 71. For example, after the first component 7 and the second component 8 have been held and fixed to each other, the external thread 31 can be partly engaged with the internal thread 72 by rotating the bolt 1 in the tightening rotation direction SB1, while bringing the distal end of the threaded part 3 of the bolt 1 in the entry direction SA1 closer to the first hole 71. The operation of partly engaging the external thread 31 of the threaded part 3 with the internal thread 72 provided in the first hole 71 is manually performed by a user of the bolt 1, for example.

Next, the bolt 1 is further rotated in the tightening rotation direction SB1. This tightens the bolt 1 to the first component 7 and moves the bolt 1 into the first component 7 in the entry direction SA1. When the bolt 1 is further rotated in the tightening rotation direction SB1, the bolt 1 can be rotated by using a tool capable of holding the head part 4 of the bolt 1, for example. In the case of the bolt 1 having the head part 4 of substantially a hexagonal cylindrical shape shown in FIG. 2, a socket wrench with a hexagonal socket is used as a tool for rotating the bolt 1, for example.

When the bolt 1 is rotated in the tightening rotation direction SB1, the first component 7 firstly comes into contact with the second component 8, and then the flange part 2 of the bolt 1 comes into contact with the second component 8 at the second surface 2b. Thus, as shown in FIG. 3, the second component 8 is sandwiched between the flange part 2 of the bolt 1 and the first component 7, so that a position of the second component 8 with respect to the first component 7 is fixed. The first component 7 and the second component 8 are thus joined by means of the bolt 1.

Figure 9:
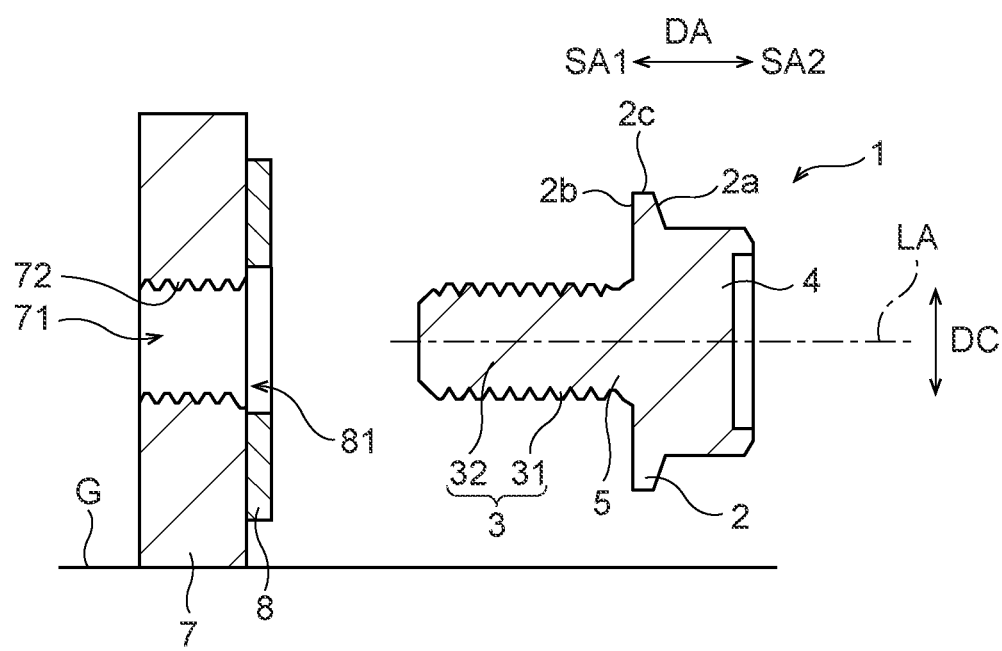
FIG. 9 is a view showing an operation of the bolt according to the embodiment of the present disclosure.

By rotating the bolt 1 in the tightening rotation direction SB1 to move the bolt 1 into the first component 7 in the entry direction SA1, a position of the second component 8 with respect to the first component 7 can be corrected by an operation of the centering part 5. In particular, as shown in FIG. 9, in a case in which the first compote 7 and the second component 8 are orthogonal to the horizontal plane G and the second component 8 is spaced apart from the horizontal plane G, the second component 8 tends to be displaced downward due to an action of gravity. Also in this case, a position of the second component 8 with respect to the first component 7 can be corrected by an operation of the centering part 5.

An operation of the centering part 5 of the bolt 1 is described below. By rotating the bolt 1 in the tightening rotation direction SB1 to continue the movement of the bolt 1 into the first component 7 in the entry direction SA1, the centering part 5 moves into the second hole 81 of the second component 8. As the centering part 5 moves into the second hole 81, the external-diameter increase portion 53 of the blade 51 comes into contact with the inner wall of the second hole 81. In particular, when the centering part 5 has fully moved into the second hole 81, each of the external-diameter increase portions 53 of the blades 51 comes into contact with the inner wall of the second hole 81 at the external-diameter increase surface 531. By way of example, each external-diameter increase portion 53 comes into contact with the inner wall of the second hole 81 at the first inclined surface 532.

When the centering part 5 is moved into the second hole 81 from the distal end in the entry direction SA1 to reach a position of a line X-X of FIG. 7, each of the external-diameter increase portions 53 of the blades 51 comes into contact with the inner wall of the second hole 81 at the external-diameter increase surface 531. By further rotating the bolt 1 in the tightening rotation direction SB1, the centering part 5 is further moved into the second hole 81 to reach a position of a line XI-XI of FIG. 7.

Figure 10:
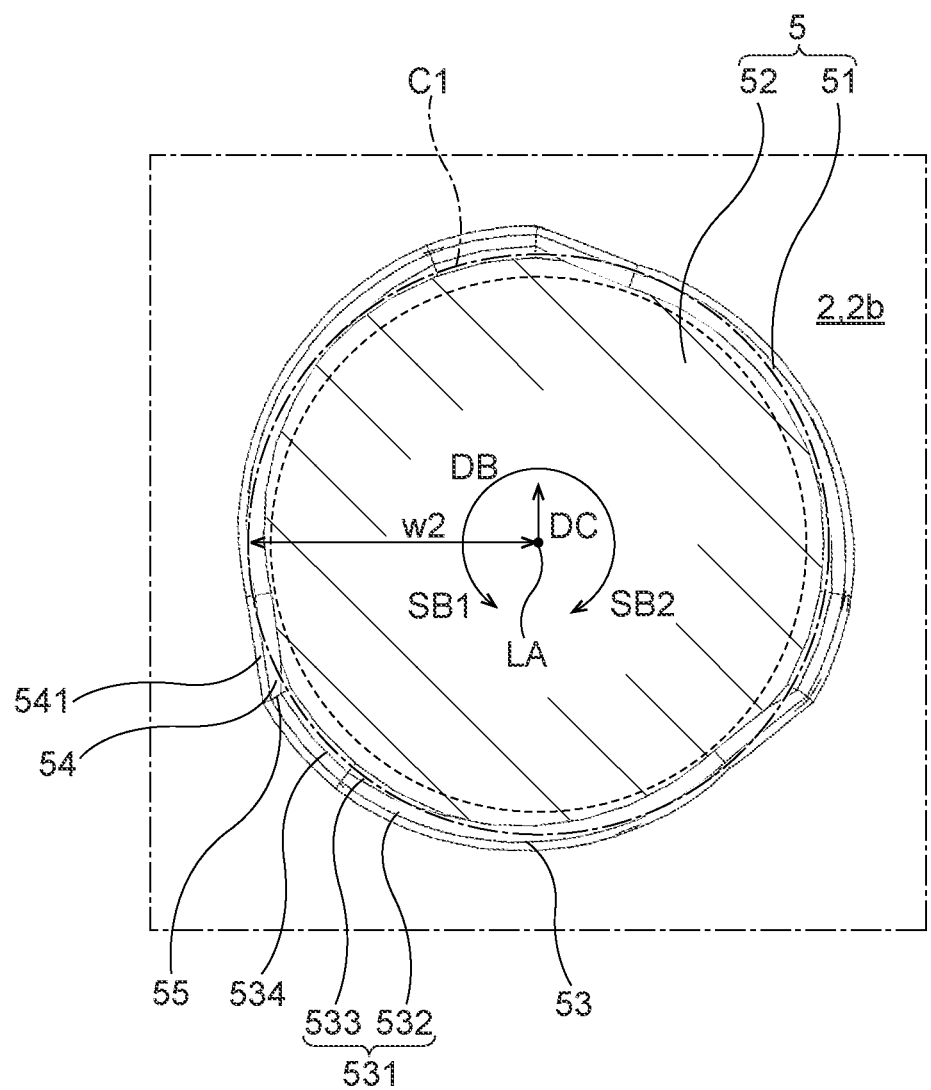
FIG. 10 is a sectional view of the bolt according to the embodiment of the present disclosure along a line X-X of FIG. 7.
Figure 11:
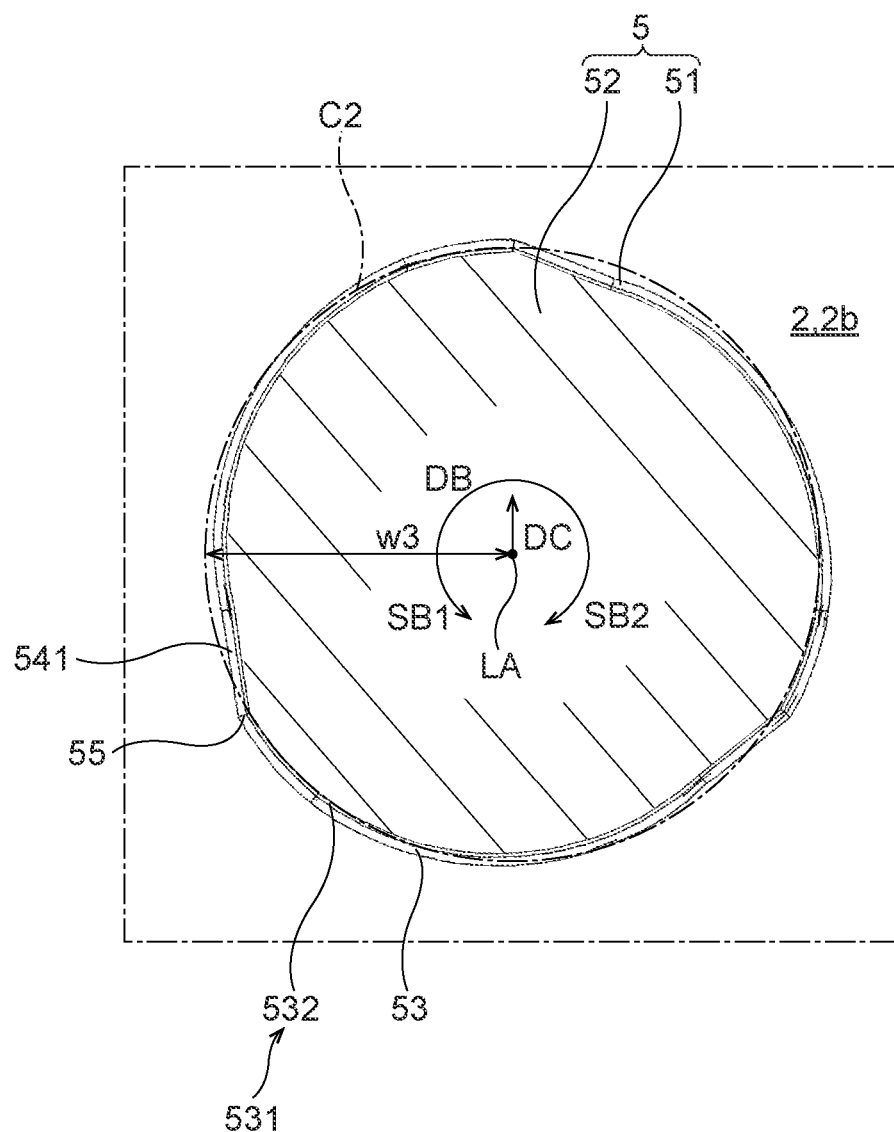
FIG. 11 is a sectional view of the bolt according to the embodiment of the present disclosure along a line XI-XI of FIG. 7.

An operation of the centering part 5 of the bolt 1 at this time is further described using the drawings. FIG. 10 is a sectional view of the bolt 1 cut along the line X-X of FIG. 7, showing a part on which the flange part 2 is located, seen from the screw part 3 side. FIG. 11 is a sectional view of the bolt 1 cut along the line XI-XI of FIG. 7, showing a part on which the flange part 2 is located, seen from the screw part 3 side. In FIGS. 10 and 11, only an area around the centering part 5 of the bolt 1 is shown.

One-dot chain lines shown in FIG. 10 show a circumscribed circle C1 of a profile line of the section of the centering part 5, in FIG. 10 showing the section of the centering part 5 in the line X-X of FIG. 7. One-dot chain lines shown in FIG. 11 show a circumscribed circle C2 of a profile line of the section of the centering part 5, in FIG. 11 showing the section of the centering part 5 in the line XI-XI of FIG. 7. In the example shown in FIGS. 10 and 11, the circumscribed circle C1 and the circumscribed circle C2 are in contact with each of the external-diameter increase portions 53 of the blades 51. In particular, the circumscribed circle C1 and the circumscribed circle C2 are in contact with each of the external-diameter increase portions 53 in the first inclined surface 532.

As shown in FIG. 7, the distance w6 from the axis LA to the outer edge of the external-diameter increase portion 53 gradually increases along the axial direction DA toward the flange part 2. Thus, a radius w3 of the circumscribed circle 2 of the profile line of the section of the centering part 5 shown in FIG. 11 is larger than a radius w2 of the circumscribed circle 1 of the profile line of the section of the centering part 5 shown in FIG. 10. This can bring about the following effect by further continuing the movement of the centering part 5 into the second hole 81 from a state in which each of the external-diameter increase portions 53 of the blades 51 is in contact with the inner wall of the second hole 81 at the external-diameter increase surface 531. Namely, a part of the centering part 5, which has a larger external diameter, is moved into the second hole 81 so that the centering part 5 is more strongly brought into contact with the second hole 81. Thus, a position of the second component 8 with respect to the centering part 5 can be corrected. Since the bolt 1 is tightened to the first component 7 and a position of the second component 2 with respect to the centering part 5 is corrected, a position of the second component 8 with respect to the first component 7 can be corrected.

Figure 12:
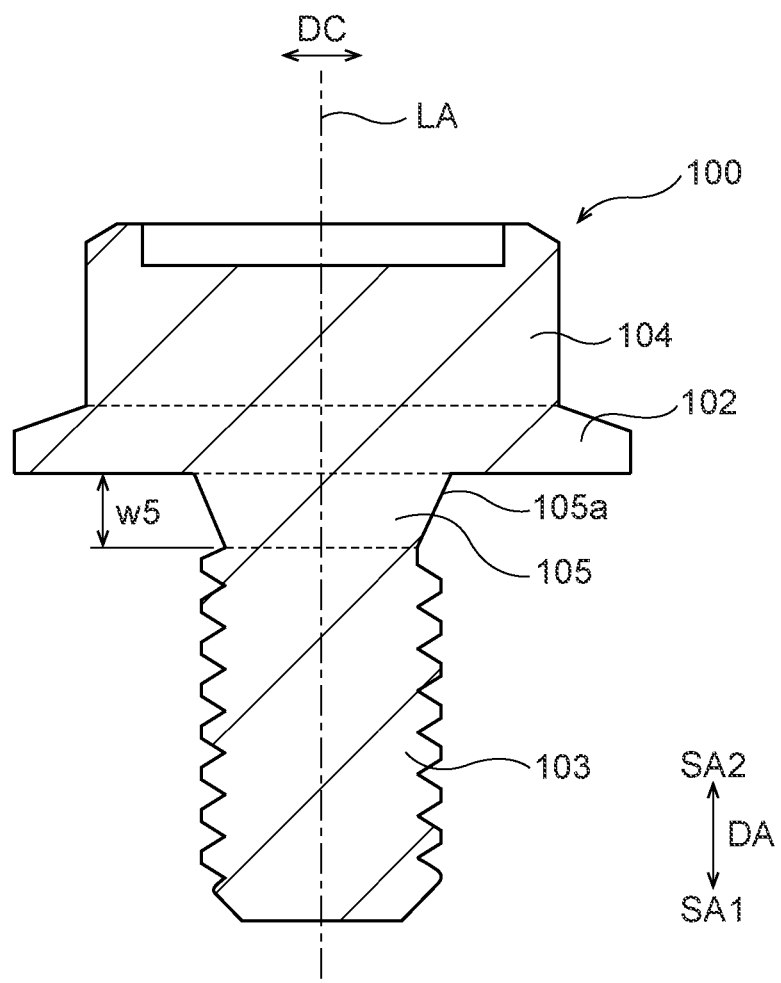
FIG. 12 is a side view of a bolt according to a comparative example.

In addition, the distance w6 from the axis LA to the outer edge of the external-diameter increase portion 53 gradually increases toward a direction opposite to the tightening rotation direction SB1 of the bolt 1. In this embodiment, since the distance w6 from the axis LA to the outer edge of the external-diameter increase portion 53 gradually increases, the following effect can be obtained. An operation/effect according to this embodiment is described below in comparison with a comparative example. The comparative example uses a bolt 100 having a similar shape as the bolt 1 in this embodiment of the present disclosure. However, the bolt 100 has, instead of the centering part 5, a truncated conical part 105 at a poison of the centering part 5. FIG. 12 is a side view showing the bolt 100 in the comparative example, seen from the radial direction DC. Broken lines shown in FIG. 12 are lines indicating boundaries of a flange part 102, a threaded part 103, a head part 104 and the truncated conical part 105 for the sake of convenience. As shown in FIG. 12, the truncated conical part 105 of the bolt 100 in the comparative example has a side surface 105a which is inclined such that an external diameter of the truncated conical part 105 increases toward the exit direction SA2.

As the bolt 100 in the comparative example is moved into the first compote 7 in the entry direction SA1 by rotating the bolt 100 in the tightening rotation direction SB1, the truncated conical part 105 is moved into the second hole 81 of the second component 8. Since the truncated conical part 105 moves into the second hole 81, the side surface 105a of the truncated conical part 105 is pressed against an inner wall of the second hole 81 from the axial direction DA. This corrects a position of the second component 8 with respect to the truncated conical part 105. In the comparative example, the bolt 100 is tightened to the first component 7 and a poison of the second component 8 with respect to the truncated conical part 105 is corrected, so that a position of the second component 8 with respect to the first component 7 is corrected.

However, the bolt 100 in the comparative has a risk in which the inner wall of the second hole 81 and the side surface 105a are deformed because the side surface 105a is pressed against the inner wall of the second hole 81 from the axial direction DA. In order to restrain the deformation of the inner wall of the second hole 81 and the side surface 105a, it can be considered that inclination corresponding to the inclination of the side surface 105 is formed on the inner wall of the second hole 81. The inclination can decrease a force applied to the inner wall of the second hole 81 and the side surface 105a, when the side surface 105a is pressed against the inner wall of the second hole 81. However, in this case, the number of steps for manufacturing the second component 8 is increased by a process for forming the inclination on the inner wall of the second hole 81. In addition, when the second component 8 has a small thickness, it is difficult to form the inclination on the inner wall of the second hole 81. Thus, the second component 8 capable of being joined to the first component 7 by using the bolt 100 in the comparative example is limited to a component having a predetermined large thickness or more.

On the other hand, in the bolt 1 in the embodiment of the present disclosure, the distance w6 from the axis LA to the outer edge of the external-diameter increase portion 53 gradually increases along the axial direction DA toward the flange part 2. In addition, the distance w6 from the axis LA to the outer edge of the external-diameter increase portion 53 gradually increases in a direction opposite to the tightening rotation direction SB1 of the bolt 1. Thus, when the bolt 1 is tightened in the tightening rotation direction SB1, the external-diameter increase portion 53 comes into contact with the inner wall of the second hole 81. Since the external-diameter increase portion 53 comes into the inner wall of the second hole 81, a position of the second component 8 with respect to the centering part 5 can be corrected by means of a camming action which transmits a rotational force by which the bolt 1 is rotated, from the external-diameter increase portion 53 toward the inner wall of the second hole 81 in the radial direction DC. Thus, a position of the second component 8 with respect to the centering part 5 can be corrected.

In particular, by rotating the bolt 1 in the tightening rotation direction SB1 with each of the external-diameter increase portions 53 of the blades 51 being in contact with the inner wall of the second hole 81, a rotational force of the bolt 1 can be transmitted from the external-diameter increase portions 53 to a plurality of locations of the inner wall of the second hole 81. This allows a position of the second component 8 with respect to the centering part 5 to be corrected by particularly efficiently using a rotational force of the bolt 1.

According to the bolt 1 in the embodiment of the present disclosure, a position of the second component 8 with respect to the centering part 5 can be corrected by using a force by which the centering part 5 is pressed against the inner wall of the second hole 81 from the axial direction DA, as well as a rotational force of the bolt 1. Thus, although a force by which the centering part 5 is pressed against the inner wall of the second hole 81 from the axial direction DA is not greater than a force by which the side surface 105a of the truncated conical part 105 of the bolt 100 in the comparative example is pressed against the inner wall of the second hole 81 from the axial direction DA, a position of the second component 8 with respect to the centering part 5 can be corrected. Thus, the bolt 1 in the embodiment of the present disclosure can reduce a force by which the centering part 5 is pressed against the inner wall of the second hole 81 from the axial direction DA, so as to restrain the deformation of the inner wall of the second hole 81 and the centering part 5. In addition, it is not necessary for the bolt 1 in the embodiment of the present disclosure to form inclination on the inner wall of the second hole 81. Thus, increase of the number of steps for manufacturing the second component 8 can be restrained. Further, a component having a small thickness, which is difficult to form inclination on the inner wall of the second hole 81, can be used as the second component 8.

In particular, as shown in FIG. 9, in a case where the first component 7 and the second component 8 are arranged non-parallel to the horizontal plane G and the second component 8 tends to be displaced downward due to an action of gravity, the downward movement of the second component 8 can be corrected by using a rotational force of the bolt 1.

In addition, the bolt 1 in the embodiment of the present disclosure can correct a position of the second component 8 with respect to the centering part 5 by using a force by which the centering part 85 is pressed against the inner wall of the second hole 81 from the axial direction DA, as well as a rotational force of the bolt 1. Thus, although the width w4 of the blade 51 in the axial direction DA, which is shown in FIG. 8, is smaller than the width w5 of the truncated conical part 105 of the bolt 100 in the comparative example in the axial direction DA, which is shown in FIG. 12, an effect of the centering part 5 for correcting a position of the second component 8 with respect to the centering part 5 can be sufficiently obtained. Thus, even when a component having a small thickness is used as the second component 8, an effect of the centering part 5 for correcting a position of the second component 8 with respect to the centering part 5 can be sufficiently obtained. The width w4 of the blade 51 in the axial direction DA is 0.7 mm or less, for example. In addition, even when the thickness w8 of the second component 8 showing in FIG. 3 is small, the width w4 of the blade 51 in the axial direction DA can be equal to or less than the thickness w8 of the second component 8. By way of example, the width w4 of the blade 51 in the axial direction DA is between equal to or more than 0.8 times and equal to or less than 1 times the thickness 28 of the second component 8. The width w4 of the blade 51 in the axial direction DA may be larger than the thickness w8 of the second component 8.

A maximum distance w9 from the axis LA to the outer edge of the blade 51, which is shown in FIG. 6, is preferably between equal to or more than 0.95 times and equal to or less than 1 times a radius w10 of the second hole 81 of the second component 8, which is shown in FIG. 3. When the distance w9 is between equal to or more than 0.95 times and equal to or less than 1 times the radius w10, an effect of the blade 51 for correcting a position of the second component 8 with respect to the centering part 5 can be more efficiently generated.

In the bolt 1 in the embodiment of the present disclosure, the external-diameter increase portion 53 has the first inclined surface 532, and the second inclined surface 533 positioned closer to the threaded part 3 than the first inclined surface 532 in the axial direction DA. In a section passing though the axis LA of the bolt 1, the first inclined surface 532 is inclined with respect to the axis LA at the first angle θ1. In addition, in a section passing though the axis LA of the bolt 1, the second inclined surface 533 is inclined with respect to the axis LA at the second angle θ2. The second angle θ2 is larger than the first angle θ1. This provides the following effect.

When the bolt 1 is inserted into the first hole 71 of the first component 7 and the second hole 81 of the second component 8, the centering part 5 of the bolt 1 is firstly inserted into the second hole 81 of the second component 8 at the second inclined surface 533. In this case, the second angle θ2 at which the second inclined surface 533 is inclined is set as an angle larger than the first angle θ1 at which the first inclined surface 532 is inclined. Thus, when the bolt 1 is seen from the threaded part 3 side as shown in FIG. 6, a planar dimension of the second inclined surface 533 tends to be larger than a planar dimension of the first inclined surface 532. Thus, the fact that the second angle θ2 is larger than the first angle θ1 provides the following effect. Firstly, a case in which, after the threaded part 3 of the bolt 1 has been passed through the second hole 81 with a position of the second component 8 being largely displaced from the first component 7, the bolt 1 is continuously tightened to the first component 7 is considered. When the bolt 1 is rotated in the tightening rotation direction SB1 to tighten the bolt 1 to the first component 7, the centering part 5 of the bolt 1 is moved close to the second hole 81 of the second component 8 in the entry direction SA1. In this case, when a position of the second component 8 is largely displaced from the first component 7, there is a possibility that the inner wall of the second hole 81 is not in contact with the first inclined surface 532, only by moving the centering part 5 close to the second hole 81 in the entry direction SA1. According to the embodiment, since the blade 51 has the second inclined surface 533 and the second angle θ2 is larger than the first angle θ1, it is easy for the inner wall of second hole 81 to be in contact with the second inclined surface 533. By further tightening the bolt 1 to the first component 7 with the inner wall of the first hole 81 being at least partly in contact with the second inclined surface 533, the inner wall of the second hole 81 can be slid along the second inclined surface 533 so as to be in contact with the first inclined surface 532.

Then, the centering part 5 of the bolt 1 comes into contact with the inner wall of the second hole 81 of the second component 8 at the first inclined surface 532. At this time, the first angle θ1 at which the first inclined surface 532 is inclined is set as an angle smaller than the second angle θ2 at which the second inclined surface 533 is inclined. The smaller the first angle θ1 is, relatively the more a distance between the first inclined surface 532 and the axis LA in the radial direction DC, even at a position apart from the flange part 2. This makes it easy for the first inclined surface 532 to come into contact with the inner wall of the second hole 81, even at a position apart from the flange part 2. By rotating the bolt 1 in the tightening rotation direction SB1 with each of the external-diameter increase portions 53 of the blades 51 being in contact with the inner wall of the second hole 81 at the first inclined surface 532, a rotational force of the bolt 1 can be transmitted from each of the external-diameter increase portions 53 to the inner wall of the second hole 81. This can correct a position of the second component 8 with respect to the centering part 5 by efficiently using a rotational force of the bolt 1.

In the bolt 1 in the embodiment of the present disclosure, the inclined surface ridge 534 formed by connecting the first inclined surface 532 and the second inclined surface 533 is inclined to be away from the flange part 2 toward the tightening rotation direction SB1. Thus, on a side closer to the entry direction SA1 of the external-diameter increase portions 53, a ratio of the first inclined surface 532 with respect to the entire external-diameter increase surface 531 decreases, and a ratio of the second inclined surface 533 increases. In addition, on a side closer to the exit direction SA2 of the external-diameter increase portions 53, a ratio of the first inclined surface 532 with respect to the entire external-diameter increase surface 531 increases, and a ratio of the second inclined surface 533 decreases. Thus, on a side closer to the entry direction SA1 of the centering part 5, the inner wall of the second hole 81 is easy to be in contact with the second inclined surface 533. Thus, on a side closer to the entry direction SA1 of the centering part 5, an effect provided particularly by the second inclined surface 533 of the external-diameter increase surface 531 can be easily obtained. Namely, on a side closer to the entry direction SA1 of the centering part 5, when a position of the second component 8 is largely displaced, it is easy to slide the inner wall of the second hole 81 along the second inclined surface 533 to be in contact with the first inclined surface 532. On the other hand, on a side closer to the exit direction SA2 of the centering part 5, the inner wall of the second hole 81 is easy to be in contact with the first inclined surface 532. Thus, on a side further closer to the exit direction SA2 of the centering part 5, an effect provided particularly by the first inclined surface 532 of the external-diameter increase surface 531 can be easily obtained. Namely, with each of the external-diameter increase portions 53 of the blades 51 being in contact with the inner wall of the second hole 81 at the first inclined surface 532, a position of the second compote 8 with respect to the centering part 5 can be corrected by efficiently using a rotational force of the bolt 1.

In the bolt 1 in the embodiment of the present disclosure, as described above, the centering part 5 has the blades 51 the number of which is between three or more and six or less.

Since the number of the blades 51 of the centering part 5 is three or more, the inner wall of the second hole 81 can be in contact with the blades 51 at three or more locations, when the bolt 1 is rotated in the tightening rotation direction SB1 to move the centering part 5 into the second hole 81. Thus, when the bolt 1 is further rotated in the tightening rotation direction SB1, a position of the second component 8 with respect to the centering part 5 can be stably corrected while maintaining a state in which the inner wall of the second hole 81 is supported by the centering part 5 having the blades 51 at three or more locations.

On the other hand, the fact that the number of the blades 51 of the centering part 5 is six or less provides the following effect. A length per blade 51 along the circumferential direction DB can be increased. In particular, a length per external-diameter increase portion 53 of the blade 51 along the circumferential direction DB can be increased. Thus, an effect of the blades 51 for correcting a position of the second component 8 with respect to the centering part 5 can be more efficiently generated. Due to distortion in shape of the bolt 1 and the second hole 81 of the second component 8, there may be a blade 51 which does not come into contact with the inner wall of the second hole 81, when the centering part 5 is moved into the second hole 81. Since the number of the blades 51 is six or less, increase in the number of blades 51 that do not come into contact with the inner wall of the second hole 81 is restrained, so that an effect of the blades 51 for correcting a position of the second component 8 with respect to the centering part 5 can be more efficiently generated.

The aforementioned embodiment can be variously modified. A modification example is described below with reference to the drawings. In the following description and in the drawings used in the following description, the same reference numerals as those used for the corresponding parts in the above specific example will be used for parts that can be configured in the same way as in the above specific example, and redundant explanations will be omitted.

(Modification Example)

In the aforementioned embodiment, an example in which the bolt 1 joins two components, i.e., the first component 7 and the second component 8, is described. However, components joined by means of the bolt 1 are not limited thereto. The bolt 1 may join three or more components including the first component 7 and the second component 8.

Figure 13:
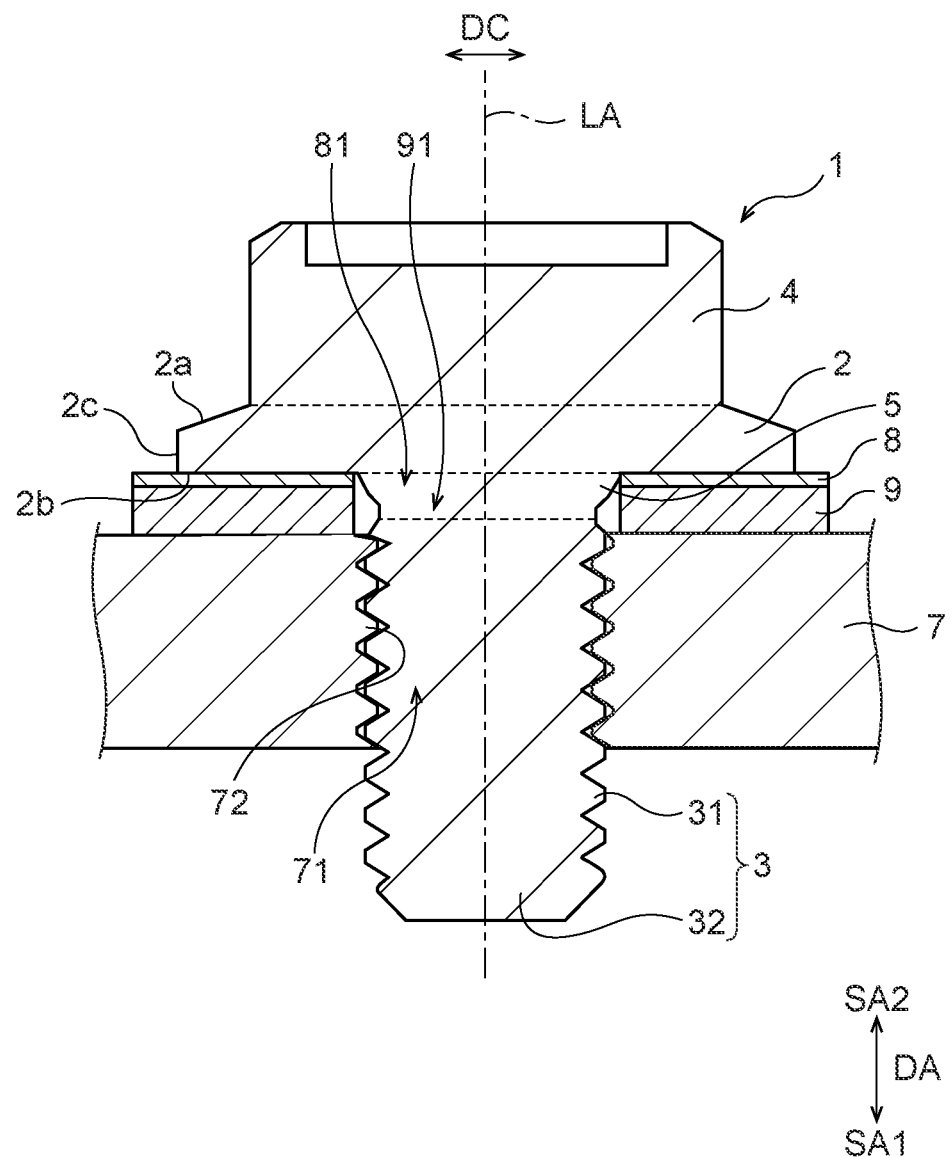
FIG. 13 is a sectional view showing an example in which a bolt according to a modification example joins a plurality of components.

FIG. 13 is a sectional view showing an example in which the bolt 1 in the modification example joins three or more components including the first component 7 and the second component 8. Broken lines shown in FIG. 13 are lines indicating boundaries of the flange part 2, the threaded part 3, the head part 4 and the centering part 5 for the sake of convenience. In the example shown in FIG. 13, the bolt 1 joins the first component 7 and the second component 8 as well as a third component 9.

The third component 9, which is other than the first component 7 and the second component 8 of the components to be joined by means of the bolt 1, has a third hole 91 into which a part of the bolt 1 is inserted. At least any one of the threaded part 3 and the centering part 5 of the bolt 1 is inserted into the third hole 91 of the third component 9. In the example shown in FIG. 13, the third component 9 has a structure similar to the aforementioned second component 8, as long as they are not contradictory to each other.

Three or more components including the first component 7 and the second component 8 can be joined by means of the bolt 1 by the following method. The first component 7 and the second component 8 are placed on top of each other and the third component 9 is sandwiched between the first component 7 and the second component 8, such that the first hole 71, the second hole 81 and the third hole 91 conform to one another. Then, the threaded part 3 of the bolt 1 is passed through the second hole 81 and the third hole 91 of the third component 9 from a distal end of the threaded part 3 in the entry direction SA1. Then, the bolt 1 is rotated in the tightening rotation direction SB1 to engage the external thread 31 of the threaded part 3 with the internal thread 72 provided in the first hole 71, so that the bolt 1 is tightened to the first component 7. Thus, the three or more components including the first component 7 and the second component 8 can be joined by means of the bolt 1. In the example shown in FIG. 13, the third component 9 is sandwiched between the first component 7 and the second component 8, with the first hole 71, the second hole 81 and the third hole 91 conforming to one another. The threaded part 3 of the bolt 1 passes through the second hole 81 and the third hole 91, and the bolt 1 is tightened to the first component 7.

In the above modification example, the centering part 5 may be inserted into the second hole 81 and may also be inserted into the third hole 91 of the third component 9. In particular, the external-diameter increase portion 53 of the blade 51 of the centering part 5 may be positioned in the third hole 91 of the third component 9. Thus, the external-diameter increase portion 53 of the blade 51 can be in contact with the inner wall of the third hole 91 of the third component 9. This can correct a position of the third component 9 with respect to the centering part 5 by an effect of the centering part 5, to thereby correct a position of the third component 9 with respect to the first component 7.

In the example shown in FIG. 13, the centering part 5 is partly inserted into the third hole 91 of the third component 9. In particular, the external-diameter increase portion 53 of the blade 51 of the centering part 5 is positioned in the third hole 91 of the third component 9. In this case, the external-diameter increase portion 53 of the blade 51 can be in contact with the inner wall of the third hole 91 of the third component 9, so that a position of the third component 9 with respect to the centering part 5 can be corrected by an effect of the centering part 5. The above modification example shows an example in which the third component 9, which is a component other than the first component 7 and the second component 8, is interposed between the first component 7 and the second component 8. However, not limited thereto, the third component 9 and a fourth component may be provided as a component other than the first component 7 and the second component 8, and the third component 9 and the forth component may be interposed between the first component 7 and the second component 8.

A plurality of constituent elements disclosed in the above embodiment and the above modification example may be suitably combined according to need. Alternatively, some constituent elements may be deleted from all the constituent elements shown in the above embodiment and the modification example.

1 Bolt
2 Flange part
3 Threaded part
31 External thread
32 Threaded part body
4 Head part
5 Centering part
51 Blade
52 Centering part body
53 External-diameter increase portion
531 External-diameter increase surface
532 First inclined surface
533 Second Inclined surface
534 Inclined surface ridge
54 Connection portion
541 External-diameter decrease portion
55 Ridge
7 First component
71 First hole
72 Internal thread
8 Second component
81 Second hole

What is claimed is:

1. A bolt having an axis, the bolt configured to be fitted in a first hole of a first component and in a second hole of a second component in order to join the first component and the second component, the bolt comprising:
   a flange part configured to abut against the second component;
   a threaded part attached to the flange part, the threaded part configured to be inserted into the first hole of the first component;
   a head part provided on an opposite side of the threaded part of the flange part; and
   a centering part provided between the flange part and the threaded part, the centering part configured to be inserted into the second hole of the second component;
   wherein:
   the centering part has a centering part body, and a plurality of blades provided on an outer circumference of the centering part body to extend in a circumferential direction;

each blade has an external-diameter increase portion in which a distance from the axis to an outer edge gradually increases toward a direction opposite to a tightening rotation direction of the bolt, and a distance from the axis to the outer edge gradually increases along an axial direction toward the flange part;

the external-diameter increase portion has a first inclined surface, and a second inclined surface positioned closer to the threaded part in the axial direction than the first inclined surface;

the first inclined surface and the second inclined surface are connected to each other at an inclined surface ridge; and the inclined surface ridge is inclined to be away from the flange part toward the tightening rotation direction.

2. The bolt according to claim 1, wherein:

in a section passing through the axis of the bolt, the first inclined surface has a first angle $\theta 1$ inclined with respect to the axis, and the second inclined surface has a second angle $\theta 2$ inclined with respect to the axis; and the second angle $\theta 2$ is larger than the first angle $\theta 1$.

3. The bolt according to claim 1, wherein the centering part has the blades the number of which is between three or more and six or less.

4. The bolt according to claim 1, wherein a width of the blade in the axial direction is 0.7 mm or less.

5. A joint, comprising:

a first component with a first hole;

a second component with a second hole; and the bolt according to claim 1, fitted in the first hole and the second hole, wherein a width of the blade in the axial direction is between 0.8 times or more and 1 times or less a thickness of the second component.

6. The bolt according to claim 1, wherein the first angle $\theta 1$ and the second angle $\theta 2$ are each greater than zero.

7. A joint, comprising:

a first component with a first hole;

a second component with a second hole; and the bolt according to claim 1, fitted in the first hole and the second hole, wherein a maximum distance from the axis to an outer edge of the blade is between 0.95 times or more and 1 times or less a radius of the second hole.

* * * * *